(12) United States Patent
Kumar et al.

(10) Patent No.: US 9,960,812 B2
(45) Date of Patent: May 1, 2018

(54) ADVANCED ROUTING MECHANISMS FOR SECURE ELEMENTS

(71) Applicant: QUALCOMM Incorporated, San Diego, CA (US)

(72) Inventors: Utkarsh Kumar, San Diego, CA (US); Gueyoung Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 14/641,083

(22) Filed: Mar. 6, 2015

(65) Prior Publication Data

US 2016/0142109 A1 May 19, 2016

Related U.S. Application Data

(60) Provisional application No. 62/080,166, filed on Nov. 14, 2014.

(51) Int. Cl.
*H04B 5/00* (2006.01)
*H04W 4/00* (2018.01)
*H04W 12/08* (2009.01)

(52) U.S. Cl.
CPC .......... *H04B 5/0031* (2013.01); *H04W 4/008* (2013.01); *H04W 12/08* (2013.01)

(58) Field of Classification Search
CPC .................................................. H04W 4/008
See application file for complete search history.

(56) References Cited

U.S. PATENT DOCUMENTS

| 7,905,419 | B2 | 3/2011 | Charrat |
| 2009/0312011 | A1 | 12/2009 | Huomo et al. |
| 2012/0178366 | A1 | 7/2012 | Levy et al. |
| 2012/0238206 | A1 | 9/2012 | Singh et al. |
| 2013/0040565 | A1 | 2/2013 | Suzuki |

(Continued)

FOREIGN PATENT DOCUMENTS

EP 2 775 739 A1 9/2014

OTHER PUBLICATIONS

International Search Report and Written Opinion—PCT/US2015/055148—ISA/EPO—dated Nov. 27, 2015, (11 pages).

*Primary Examiner* — Hsin-Chun Liao
(74) *Attorney, Agent, or Firm* — Arent Fox, LLP

(57) ABSTRACT

Various aspects are described herein in connection with a method and/or apparatus of near-field communication (NFC). For example, various methods and apparatuses include a NFC controller receiving a current message from a NFC reader. Methods and apparatuses include the NFC controller determining that the current message received from the NFC reader is not associated with a known secure element identification, identifying a secure element corresponding to a last response message sent to the NFC reader, and sending the current message to the identified secure element that originated the last response message sent to the NFC reader. Methods and apparatuses also include the NFC controller receiving a request message from the NFC reader prior to the receiving of the current message, receiving the last response message from one of a plurality of secure elements, and saving an identification of the one of the secure elements that sent the last response message.

22 Claims, 8 Drawing Sheets

(56) References Cited

U.S. PATENT DOCUMENTS

| | | | |
|---|---|---|---|
| 2013/0143489 A1* | 6/2013 | Morris | H04B 5/0056 455/41.1 |
| 2013/0205414 A1 | 8/2013 | Jussila | |
| 2013/0225073 A1 | 8/2013 | O'Donoghue et al. | |
| 2014/0035727 A1 | 2/2014 | Nguyen | |
| 2015/0142589 A1* | 5/2015 | Jin | G06Q 20/206 705/18 |

* cited by examiner

Protocol Table 344a

| Type | Destination |
|---|---|
| NFC DEP | Device Host |
| APDU | SE1 |
| - - - | - - - |

344

← T3T Type

Technology Table 344b

| Type | Destination |
|---|---|
| Type A | SE1 |
| Type B | SE2 |
| - - | - - |

← Type F

NFCID2 Table 344c

| ID | Destination |
|---|---|
| ID#1 | SE1 |
| ID#2 | SE2 |
| ID#3 | SE3 |

Secure Element Message Memory 346

ADVANCED ROUTING MECHANISMS FOR SECURE ELEMENTS

CROSS-REFERENCE TO RELATED APPLICATION

This application claims the benefit of U.S. Provisional Application Ser. No. 62/080,166, entitled, "Advanced Routing Mechanisms for Type F Frames," and filed on Nov. 14, 2014, which is expressly incorporated by reference herein in its entirety.

BACKGROUND

The disclosed aspects relate generally to communications between and/or within devices and specifically to improving near-field communication mode signaling.

Advances in technology have resulted in smaller and more powerful personal computing devices. For example, there currently exist uses of a variety of portable personal computing devices, including wireless computing devices such as portable wireless telephones, personal digital assistants (PDAs), and paging devices that each small, lightweight, and can easily be carried by users. More specifically, the portable wireless telephones, for example, further include cellular telephones that communicate voice and data packets over wireless networks. Many such cellular telephones are manufactured with ever-increasing computing capabilities, and as such, are becoming tantamount to small personal computers and hand-held PDAs. Further, such devices are enabling communications using a variety of frequencies and applicable coverage areas, such as cellular communications, wireless local-area network (WLAN) communications, near-field communication (NFC), etc.

In some NFC devices, one or more secure elements (SEs) can provide data via the NFC device to a remote device, such as a NFC reader. This, in turn, can cause interoperability issues with the current NCI specification, as it becomes difficult, for example, to support multiple secure elements for services like card emulation under certain conditions. Thus, improvements for interoperability of multi-SE NFC devices may be desired.

SUMMARY

The following presents a summary of one or more aspects to provide a basic understanding of such aspects. This summary is not extensive overview of all contemplative aspects, and is not intended to identify key or critical elements of all aspects nor delineate the scope of any or all aspects. Its purpose is to present some concepts of one or more aspects form as a prelude to the more detailed description presented later.

Various aspects are described in connection with managing messages for multiple secure elements in a NFC device. For example, methods include a NFC controller receiving a current message from a NFC reader. The NFC controller determines that the current message received from the NFC reader is not associated with a known secure element identification. The NFC controller identifies a secure element corresponding to a last response message sent to the NFC reader, and sends the current message to the identified secure element that originated the last response message sent to the NFC reader.

In an aspect, an apparatus for managing messages for multiple secure elements in a NFC device is provided. The apparatus includes means for receiving a current message from a NFC reader. The apparatus includes means for determining that the current message received from the NFC reader is not associated with a known secure element identification. The apparatus includes means for identifying a secure element corresponding to a last response message sent to the NFC reader. The apparatus includes means for sending the current message to the identified secure element that originated the last response message sent to the NFC reader.

In an aspect, an apparatus for managing messages for multiple secure elements in a NFC device is provided. The apparatus includes a NFC controller. The NFC controller is configured receive a current message from a NFC reader. The NFC controller is also configured determine that the current message received from the NFC reader is not associated with a known secure element identification. The NFC controller is also identify a secure element corresponding to a last response message sent to the NFC reader. The NFC controller send the current message to the identified secure element that originated the last response message sent to the NFC reader.

In an aspect, a non-transitory computer-readable medium storing computer-executable code for NFC is provided. The computer-readable medium includes code for receiving a current message from a NFC reader. The computer-readable medium also includes code for determining that the current message received from the NFC reader is not associated with a known secure element identification. The computer-readable medium also includes code for identifying a secure element corresponding to a last response message sent to the NFC reader. The computer-readable medium also includes code for sending the current message to the identified secure element that originated the last response message sent to the NFC reader.

In an aspect, various methods, computer-readable media, and apparatuses also include the NFC controller receiving a request message from the NFC reader prior to the receiving of the current message, receiving the last response message from one of a plurality of secure elements, and saving an identification of the one of the secure elements that sent the last response message. In an aspect, methods, computer-readable media, and apparatuses also include the NFC controller referring to a table of known protocol-based routing entries in response to receiving the current message, and determining that an entry for a protocol type corresponding to the protocol type of the current message is not included in the table of known protocol-based routing entries. In an aspect, methods, computer-readable media, and apparatuses also include the NFC controller referring to a table of known technology-based routing entries in response to receiving the current message, and determining that an entry for a technology type corresponding to the technology type of the current message is not included in the table of known technology-based routing entries.

To accomplish the forthcoming and related ends, the one or more aspects comprise features hereinafter fully described and particularly pointed out in the claims. The following description and the annexed drawings set forth detail certain illustrated features of the one or more aspects. These features are indicative, however, of but a few of the various ways in which the principles of various aspects may be employed, and this description is intended to include all such aspects of their equivalents.

BRIEF DESCRIPTION OF THE DRAWINGS

The disclosed aspects will hereinafter be described in conjunction with the appended drawings, provided to illustrate and not to limit the disclose aspects, wherein like destinations denote like elements, and in which:

FIG. 4 is a diagram of routing tables in the NFC environment in accordance with an aspect of the present disclosure;

DETAILED DESCRIPTION

Figure 1:
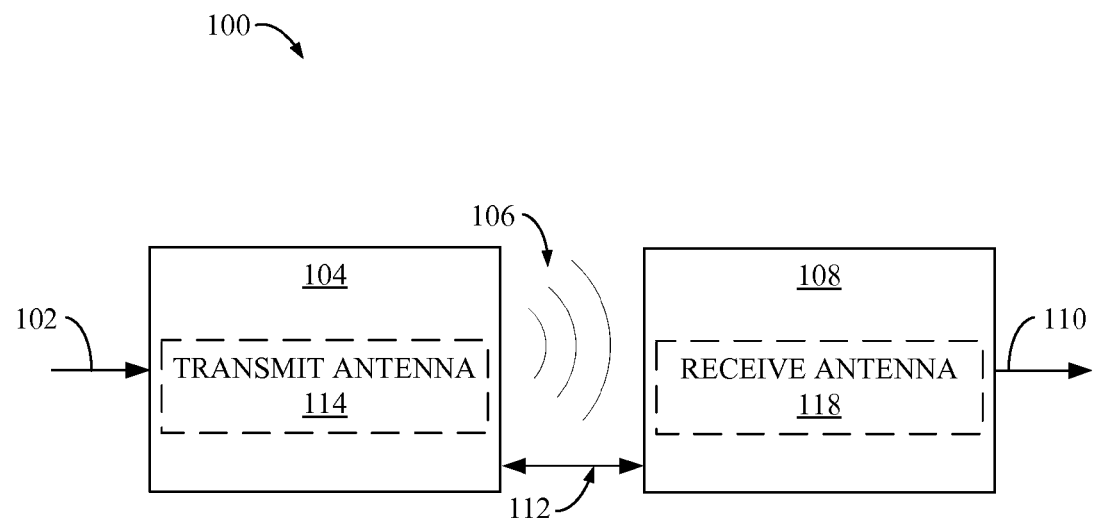
FIG. 1 is a block diagram of a wireless communication system in accordance with an aspect of the present disclosure.

Various aspects are now described with reference to the drawings. In the following description, for purposes of explanation, numerous specific details are set forth to provide a thorough understanding of one or more aspects. It should be understood, however, that such aspect(s) may be practice without these specific details.

The present aspects generally relate to managing messages for multiple secure elements in a NFC device (e.g., including but not limited to RF Type-F Technology). Specifically, the present aspects provide a way of identifying a target secure element amongst a plurality of secure elements and or virtual secure elements in the device host based on previous messages sent by the NFC device to a remote NFC device, such as a NFC reader. For example, the NFC device can first receive a polling command, such as a RF technology Type F (Type-F) polling command (e.g., SENSF_REQ). A NFC controller in the NFC device can send the polling command to each of the plurality of secure elements and/or device host. The NFC controller can choose among the multiple polling responses received from the plurality of secure elements and/or device host and send one of the polling responses to the NFC reader. The NFC controller can save the identity (e.g., NFCID2) of the secure element that originated the polling response message that the NFC controller chose to send to the NFC reader.

When NFC reader sends another command to the secure element identified in the polling response, the command may not have the identifier of the secure element (e.g., NFCID2) included in the message. The NFC controller may, after looking up the applicable protocol and technology types in its stored listen mode routing tables and finding no entries for the received command, use customized (e.g., proprietary) routing methods and mechanisms to determine a destination for the received command. In particular, the NFC controller can look-up the identity that was saved when sending the polling response to determine the target for the received command and can then forward the received command to the identified secure element.

In an aspect, the NFC controller can use one or more routing tables to determine the destination of commands received from the NFC reader. In an aspect, the NFC controller can first look to a identifier-based routing table, while falling back a protocol-based routing table or a technology-based routing table if the applicable information is not listed in the identifier-based routing table. When the NFC controller receives a message with a missing identifier or an unknown identifier, it can use one or more of these routing tables to determine an applicable target.

According to one or more of the present aspects, the methods and apparatus described herein may maintain the protocol-based routing table and/or technology-based routing table so that they do not have entries for types that are supported by two or more secure elements and/or device host. When such entries are not listed, the NFC controller can fall back to a custom routing method and mechanism. In particular, according to one or more of the present aspects, the methods and apparatus described herein may utilize a routing method and mechanism that includes the NFC controller saving the identity of the secure element whose response to a polling command was last sent to the NFC reader. For subsequent commands received from the NFC reader, the NFC controller can use the saved identity to determine that the secure element associated with the saved identity is the destination for the received command from the NFC reader.

Aspects of the present disclosure are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described herein are presently particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 3:
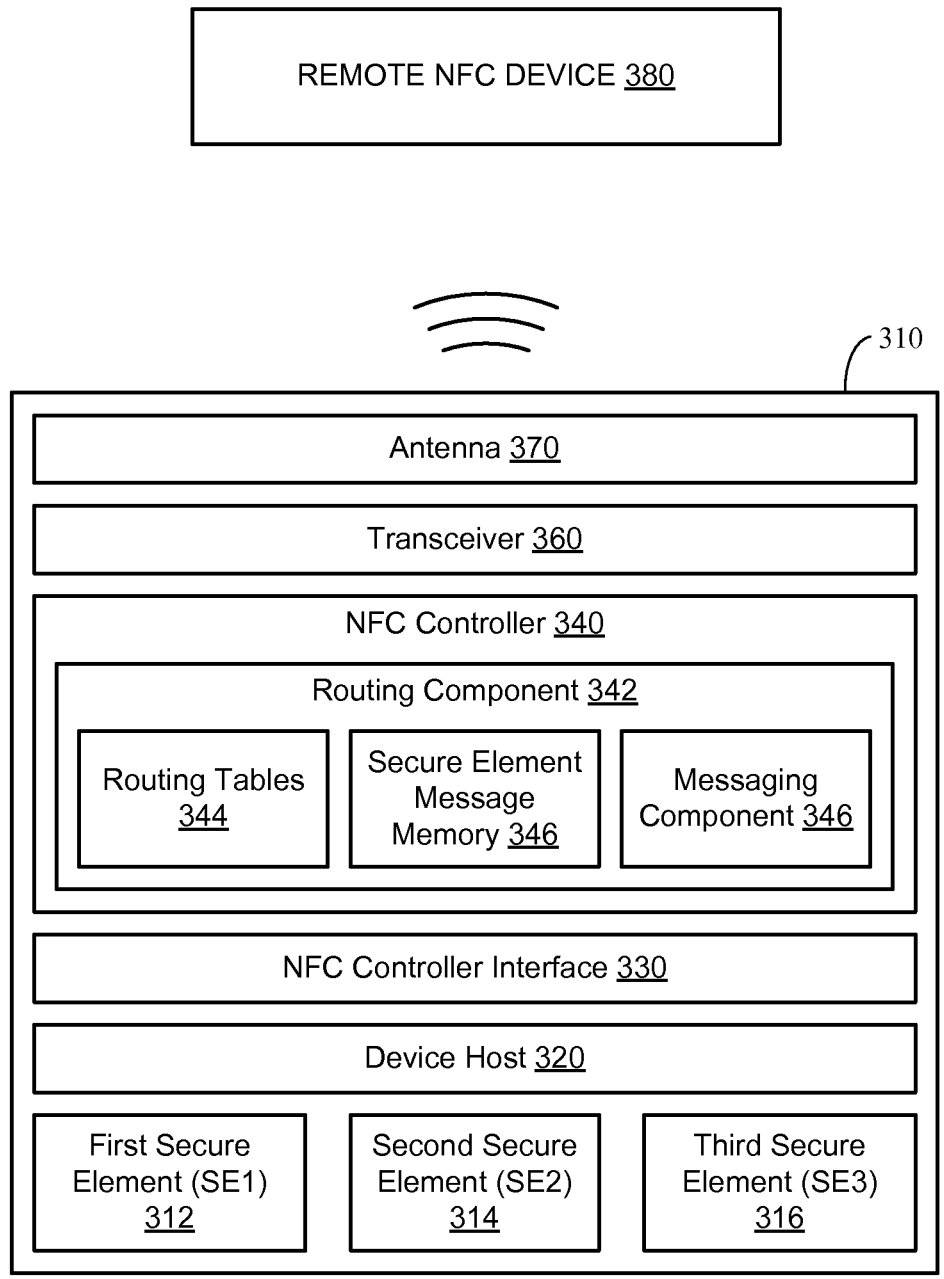
FIG. 3 is a block diagram of a NFC environment in accordance with an aspect of the present disclosure.

FIG. 1 illustrates a wireless transmission or charging system 100, which may implement one or more of the various aspects described herein with respect to FIGS. 3-8. In some aspects, transmitter 104 or receiver 108 can be included as part of NFC device 310 (FIG. 3). Specifically, for example, transmitter 104 or receiver 108 can form or otherwise be part of transceiver 360 (FIG. 3). Additionally, transmit antenna 114 or receive antenna 118 can form or otherwise be part of antenna 370 (FIG. 3). Input power 102 is provided to a transmitter 104 for generating a radiated inductive field 106 for providing energy transfer. A receiver 108 couples to the radiated inductive field 106 and generates an output power 110 for storage or consumption by a device coupled to the output power 110. Both transmitter 104 and receiver 108 are separated by a distance 112, which is also referred to herein as an operating volume (OV). In one example, transmitter 104 and receiver 108 are configured according to a mutual resonant relationship and when the resonant frequency of receiver 108 and the resonant frequency of transmitter 104 are within a threshold OV, transmission losses between transmitter 104 and receiver 108 are minimal (e.g., when receiver 108 is located in the "near-field" of the radiated inductive field 106).

Transmitter 104 can include a transmit antenna 114 for transmitting energy and signals. Receiver 108 includes a receive antenna 118 for receiving signals and energy, if needed. Transmit antenna 114 and receive antenna 118 can be sized according to applications and devices associated therewith. As stated, and efficient energy transfer can occur by coupling a large portion of the energy in the near field of transmitting antenna 114 to receive antenna 118 rather than propagating most of the energy an electromagnetic wave to a far field. When in this near field, a coupling mode may be developed between transmit antenna 114 and receive antenna 118. The area around antennas 114 and 118 where this near-field coupling may occur is referred to herein as a coupling-mode region.

In some configurations, where transmitter 104 and receiver 108 are in very close proximity, matching networks related to antennas 114, 118 that process the signals may become detuned due to high mutual coupling in signals communicated between transmitter 104 and receiver 108, thus communications between transmitter 104 and receiver 108 may break down. This condition is referred to herein as over-coupling. In such examples, as described further herein, transmitter 104 can detect such over-coupling with receiver 108 or related receive antenna 118 and can attempt to mitigate the condition by modifying one or more transmit and/or receive parameters at transmitter 104.

Figure 2:
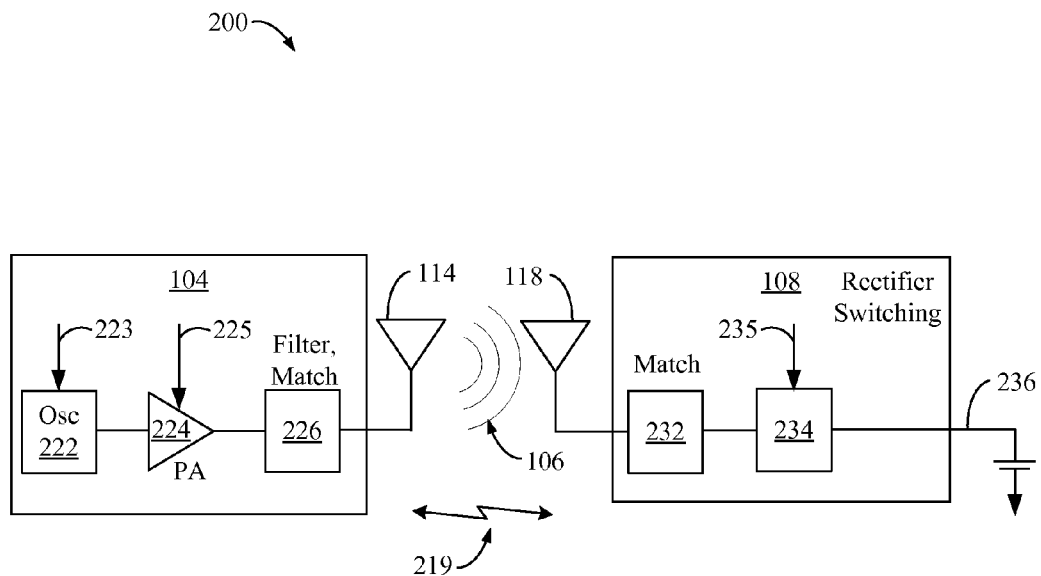
FIG. 2 is a schematic diagram of a wireless communication system in accordance with an aspect of the present disclosure.

FIG. 2 is a schematic diagram of an example near-field wireless communication system 200, which may implement one or more of the various aspects described herein with respect to FIGS. 3-8. Transmitter 104 includes an oscillator 222, a power amplifier 224 and a filter-and-matching circuit 226. In some aspects, transmitter 104 may be included as part of NFC device 310 (FIG. 3). Specifically, for example, transmitter 104 or receiver 108 may form or otherwise be part of transceiver 360 (FIG. 3). Additionally, transmit antenna 114 or receive antenna 118 may form or otherwise be part of antenna 370 (FIG. 3). Oscillator 222 is configured to generate a signal at a desired frequency, which may be adjusted in response to adjustment signal 223. the oscillator signal may be amplified by power amplifier 224 with an amplification amount responsive to control signal 225. Filter-and-matching circuit 226 may be included to filter out harmonics or other unwanted frequencies and match the impedance of transmitter 104 to transmit antenna 114.

Receiver 108 may include a matching circuit 232 and a rectifier-and-switching circuit 234 to generate a DC-power output to charge a battery 236 (as shown in FIG. 2) or power a device coupled to the receiver, though it is to be appreciated that devices may each have batteries (e.g., in peer-to-peer communications) such that powering by magnetic field may not be needed. Matching circuit 232 may be included to match the impedance of receiver 108 to receive antenna 118. Receiver 108 and transmitter 104 make communicate on a separate communications channel 219 (e.g., Bluetooth, Wi-Fi, zigbee, cellular, etc.) in one example.

Referring to FIG. 3, in an aspect, communication network 300 may include a NFC device 310 and a remote NFC device 380, both of which may be configured to communicate using NFC. NFC device 310 may include transceiver 360 an antenna 370, each of which may be configured to facilitate communication with remote NFC device 380 using a NFC. For example, remote NFC device 380 may correspond to a remote device, card, or tag, connected wirelessly over the NFC radio interface to NFC device 310. NFC device 310 can communicate with remote NFC device 380 through implementation of one or more NFC-based technologies (e.g., NFC-A, NFC-B, NFC-F, etc.). In an aspect, NFC device 310 can be configured to be connected to an access network and/or core network (e.g., a CDMA network, a GPRS network, a UMTS network, and/or other types of wired or wireless communication networks). In some aspects, remote NFC device 380 can include, but is not limited to, a remote NFC tag, a reader/writer device, a peer initiator device, a remote peer target device, etc.

In a further aspect, remote NFC device 380 may send request messages (e.g., a polling command) that, in a non-limiting aspect, may trigger NFC device 310 to determine routing information or other information corresponding to destination in NFC device 310, such as a secure element and/or device host included in NFC device 310. Furthermore, in an aspect, the request message may contain parameters associated with the communication with remote NFC device 380. These parameters can include, for example, the protocol and/or the technology used by remote NFC device 380 for communications. As a result, remote NFC device 380 may, in some non-limiting examples presented in the present application, be referred to as a requesting or initiator device.

In some aspects, NFC device 310 can include one or more secure elements, such as, but not limited to, a first secure element 312, second secure element 314, and third secure element 316. It should be noted that while three secure elements are used herein as an example, the present aspects may apply to a device having any number of two or more secure elements. Secure elements 312, 314, and 316 can be configured to communicate with NFC controller 340 and device host 320. Furthermore, in some aspects, one or more of secure elements 312, 314, and 316 can comprise: a secure element, a near-field communication execution environment (NFCEE), a virtual secure element (which can be a Card Emulation or Tag Emulation entity on device host 320), a smart card, an SD Card containing the secure computing environment (SCE), a Universal Serial Bus (USB)-based device containing the secure computing environment, etc. In some aspects, secure elements 312, 314, and 316 can include a Universal Integrated Circuit Card (UICC) with various modules such as, but not limited to, a subscriber information/identity module (SIM), a CDMA Subscriber Identity Module (CSIM), etc. In an aspect, each of the one or more secure elements 312, 314, and 316 included in NFC device 310 (or coupled thereto) may be distinguished by the NFC controller 340 using a secure computing environment identifier for use during the RF discovery process.

As noted, NFC device 310 can include NFC controller (NFCC) 342, which communicates with device host 320 and secure elements 312, 314, and 316 and can be configured to facilitate NFC operation of NFC device 310. As will be discussed in greater detail below, in some implementations, NFC controller 340 can be configured to determine, based on information provided by routing component 342, whether one or more of virtual secure elements in device host 320 and/or secure elements 312, 314, and 316 is the destination of RF technology Type-F messages received by NFC device 310. In some aspects, NFC controller 340 can direct messages to device host 320. This can occur, for example, when one of the destinations is a virtual secure element or a tag (e.g., a Type-3 Tag). Therefore, as used in this application, references to secure elements 312, 314, and 316 as a destination or source also refer to device host 320 as a destination or source.

In an aspect, NFC controller 340 can include a routing component 342, which may control data routing between components in NFC device 310 and/or communications network 300. Furthermore, routing component 342 can utilize one or more data routing tables 344 that govern the data routing operation of routing component 342. In an aspect, one or more data routing tables 344 can be loaded with routing table information from one or more of device host 320 and/or secure elements 312, 314, and 316. As noted, obtaining routing information for one of the secure elements 312, 314, and 316 or device host 320 (e.g., obtaining a destination address) is based, at least in part, on the configuration/values of the information included in each routing table 344.

For example, routing tables 344 can include one or more routing tables that include entries that may identify a target destination corresponding to one secure element of the one or more secure elements 312, 314, and 316 and/or device host 320. As will be further discussed below in relation to FIG. 4, as an example, a technology-based routing table 344*b* ("technology table") can include a Type A entry that points to first secure element 312, while including a Type B entry that points to second secure element 314. In an aspect, routing tables 344, secure element message memory 346, and/or messaging component 348 may be stored in nonvolatile memory. Alternatively, routing tables 344, secure element message memory 346, and/or messaging component 348 may be stored in volatile memory.

In an aspect, routing component 342 can include a secure element message memory 346 that stores a pointer to the secure element and/or device host that originated the last message sent to remote NFC device 310. As will be discussed in further detail in relation to FIG. 5, NFC controller 340 can identify which one of the secure elements 312, 314 and 316 or device host 320 originated a response, and can store a pointer to that secure element or device host in secure element message memory 346. In instances where a destination secure element or device host cannot be identified using routing tables 344, routing component 342 can refer to secure element message memory 346 to determine the secure element and/or device host that originated the last message sent by NFC device 310 to remote NFC device 380 and can forward a received message (e.g., a custom or proprietary command) to the secure element 312, 314 and 316 and/or device host 320 identified in secure element message memory 346.

Furthermore, messaging component 348 can be configured to receive messages from one or more of remote NFC device 380, secure elements 312, 314 and 316, and/or device host 320 and send the received message to the appropriate destination based, for example, on information stored in routing tables 344 and/or secure element message memory 346. In an aspect, messaging component 348 can extract secure element identifications, such as NFCID2 identifications included in Type F messages, and use the identifications to add and/or update entries in routing table 344. For example, as will be discussed in further detail below in relation to FIG. 4, messaging component can receive a response message from a secure element 312, 314 and 316 and/or device host 320 and can add the NFCID2 identifier for the secure element 312, 314 and 316 and/or device host 320 in a NFCID2 routing table.

NFC device 310 also includes NFC Controller Interface (NCI) 330, which can be operable to enable communications between NFC-enabled antenna 370 and NFC controller 340. Furthermore, in an aspect, NCI 330 can be operable to function in a listening mode and/or a polling mode. In an aspect, NCI 330 can enable communications between NFC controller 340 and one or more of device host 320, secure elements 312, 314 and 316, and/or with any other component of NFC device 310.

Device host 320 may provide routing table information for storage in the one or more data routing tables 344 of routing component 342 in NFC controller 340. In an aspect, the routing table information can be provided, in some cases, in response to the NFC controller 340 querying device host 320, or at some earlier stage of NFC controller configuration.

Thus, and as will also be described in greater details below, the communications network 300 and the NFC device 310 provide an efficient, optimized, and simplified procedure for providing secure or trusted data routing information to a NFC controller.

FIG. 4 is an example diagram of routing tables 344 in the NFC environment in accordance with one or more aspects of the present disclosure. Routing tables 344 include a protocol-based routing table (routing table) 344*a*, a technology-based routing table (technology table) 344*b*, a secure element identification-based routing table (NFCID2) 344*c*. FIG. 4 also illustrates secure element message memory (last message memory) 346. Routing component 342 of NFC controller 340 can use one or more of routing tables 344 and/or secure element message memory 346 to determine a destination for a received message from remote NFC device 380.

Protocol-Based routing table ("protocol table") 344*a* can be a component of routing tables 344 in routing component 342. Routing component 342 can refer to protocol table 344*a* when it cannot determine a destination secure element using a secure element identifier (e.g., NFCID2). This can occur, for example, when the received message does not include an identifier; similarly, this can occur when the identifier included in the received message is not listed in NFCID2 table 344*c*. In an aspect, device host 320 generates protocol table 344*a* during NCI initialization of NFC device 310. In such instances, device host 320 can indicate which secure elements are attached to NFC controller 340 and which protocols are supported. In some aspects, protocol table 344*a* can only include one destination for each supported protocol. In the illustrative aspect, for example, only SE1 312 is listed as the destination for a APDU protocol message. In such instances, routing component 342 uses protocol table 344*a* to lookup unidentified messages and forwards any APDU protocol messages to SE1 based on the entry in protocol table 344*a*.

In an aspect, device host 320 does not include an entry for a protocol that is supported by two or more secure elements that potentially use Type-F card emulation or support T3T protocol. For example, when SE1 312 and SE2 314 support T3T protocol, instead of including an entry for the T3T protocol (thus forwarding all T3T protocol messages to one of the two entries), device host 320 can be configured to exclude an entry in protocol table 344*a* when more than one secure element 312, 314, and 316 and/or device host 320 supports the applicable protocol. In such instances, routing component 342 can use alternative mechanisms to determine a destination for a received message that uses T3T protocol.

Technology-Based routing table 344*b* can be a component of routing tables 344 in routing component 342. Routing component 342 can refer to technology table 344*b* when it cannot determine a destination secure element and/or device host 320 using a secure element identifier (e.g., NFCID2) or through a lookup of protocol table 344*a*. In an aspect, device host 320 generates technology table 344*b* during NCI initialization of NFC device 310. In such instances, device host 320 can indicate which secure elements are attached to NFC controller 340 and which RF technology types (e.g., NFC-A, NFC-B, NFC-F, etc.) are supported. In some aspects, technology table 344*b* can only include one destination for each supported technology. In the illustrative aspect, for example, only SE2 314 is listed as the destination for an RF Type-B technology message. In such instances, routing component 342 uses technology table 344b to lookup unidentified messages that were not forwarded based on the protocol used and forwards any RF Type-B technology messages to SE2 based on the entry in technology table 344b.

In an aspect, device host 320 does not include an entry for a technology that is supported by two or more secure elements. For example, when SE1 312 and SE2 314 support RF Type F technology, instead of including an entry for the RF Type F (thus forwarding all RF Type-F technology messages to one of the two entries), device host 320 can be configured to exclude an entry in technology table 344b when more than one secure element 312, 314, and 316 and/or device host 320 supports the applicable RF technology. In such instances, routing component 342 can use alternative mechanisms to determine a destination for a received message that uses RF Type-F technology.

NFCID2 table 344c can be a component of routing table 344 in routing component 342. Routing component 342 can refer to NFCID2 table 344c when the received message includes an identification of the target secure element. As will be discussed in further detail below in relation to FIG. 5, when one or more secure elements send a response to a polling command received from remote NFC device 380, the response can include an identification of the secure element. For example, a response to a RF Type-F polling command can include a NFCID2, which is an identification for Type-F technology.

The identification can include additional information. For example, the NFCID2 can be an 8-byte value that includes an indication of which protocol is supported (e.g., NFC-DEP or T3T). In some aspects, the identification can be included in a response message, such as a SENSF_RES that is generated and sent by a secure element 312, 314, and 316 and/or device host 320 in response to a received SENS-F_REQ polling command sent by remote NFC device 380. In an aspect, messaging component 348 of routing component 342 can extract the NFCID2 from the SENSF_RES response and add an entry to NFCID2 table 344c. In an aspect, NFC controller 340 can be configured to update NFCID2 344c dynamically, and can be configured to update NFCID2 table 344c based on the last message received from a secure element 312, 314, and 316 and/or device host 320 that included the identifier.

In an aspect, routing component 342 can refer to NFCID2 table 344c when it receives a command from remote NFC device 380 that includes a identifier. In an aspect, routing component 342 can be configured to refer to NFCID2 table 344c whenever an identifier is included in a received message from remote NFC device 380. In an aspect, routing component 342 can be configured to skip lookup of NFCID2 344c when an identifier is not included in the message. In such instances, routing component 342 can instead refer to protocol table 344a, technology table 344b, then secure element message memory 346 to determine a destination for a received message.

Secure element message memory (e.g., last message memory) 346 can be a component of routing component 342. Routing component 342 can save an entry into secure element message memory 346 that points to the secure element 312, 314, and 316 and/or device host 320 that originated the last message sent from NFC device 310 to remote NFC device 380. For example, if routing component 342 receives multiple SENSF_RES responses generated by secure elements 312, 314, and 316 and/or device host 320 to respond to a polling command from remote NFC device 380, routing component 342 can choose one of the SENSF_RES responses to forward to remote NFC device 380. Routing component 342 can determine the secure element that sent the chosen SENSF_RES response and save the identity of the secure element in secure element message memory 346.

In an aspect, routing tables 344 and secure element message memory 346 can be configured such that routing component 342 uses secure element message memory 346 to store the identity of the secure element 312, 314, and 316 and/or device host 320 that last responded to a command from remote NFC device 380. In an aspect, the identity of the originating secure element of the last message is saved as the identifier for the secure element 312, 314, and 316 and/or device host 320. For example, if routing component 342 choses a SENSF_RES response received from SE3 316, routing component can save the NFCID2 corresponding to SE3 316 in secure element message memory 346. In other aspects, secure element message memory can store another pointer to SE3 316. In an aspect, routing component 342 can refer to secure element message memory 346 to determine a destination when lookups to protocol table 344a and technology table 344b did not identify a destination secure element. In another aspect, secure element message memory 346 can be configured to be overwritten each time routing component 342 sends a message to remote NFC device 380.

Figure 5:
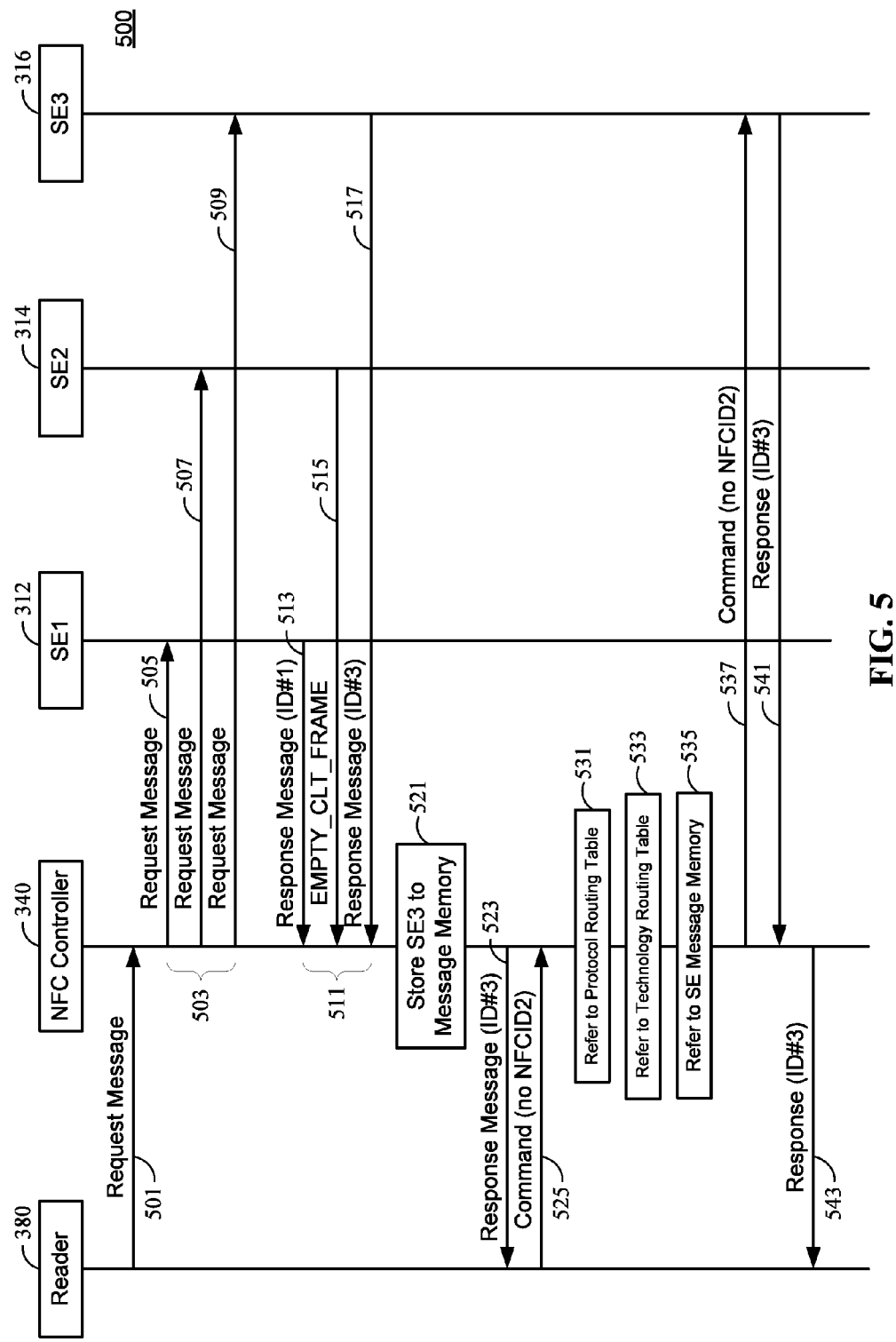
FIG. 5 is a signaling diagram describing transfers of message between devices and device components in accordance with an aspect of the present disclosure.

FIG. 5 is a signaling diagram describing transfers of message between devices and device components in accordance with an aspect of the present disclosure. Diagram 500 illustrates messages sent between remote NFC device 380 and various NFC components of NFC device 310 based on the algorithms included in routing component 342.

NFC controller 340 can receive a request message 501, such as a polling command, from remote NFC device (e.g., NFC reader) 380. NFC controller 340 can then forward the request messages 503 to each attached secure element 312, 314, and 316 and/or device host 320. In the illustrative aspect, for example, SE1 312 receives request message 505, SE2 314 receives request message 507, and SE3 316 receives request message 509.

NFC controller 340 can then receive response messages 511. In some instances, the response message can be a non-response, such as an EMPTY_CLT_FRAME message 515 received from SE2 314. In some instances, the response message can be a response to establish communications. For example, when SE1 312 and SE3 316 receive a SENS-F_REQ polling command that was forwarded from NFC reader 380, SE1 312 and SE3 316 can send respective SENSF_RES responses 513, 517 to NFC reader 380. In an aspect, each response 513, 517 can include an identifier for the originating secure element (for example, a NFCID2).

At block 521, NFC controller 340 can store an identity of a secure element into message memory. For example, NFC controller 340 can receive multiple response messages from secure elements 312, 314, and 316 and/or device host 320. NFC controller 340 can chose to forward one of the messages and store the identity of the originating secure element in secure element message memory 346. In some aspects, NFC controller 340 can choose based on internal criteria, such as the order of reception. In the illustrative aspect, for example, NFC controller 340 can chose to forward response 517 received from SE3 316 to remote NFC device 380 as response 523. The decision to send response 517 can be based, for example, on receiving response 517 most recently; in an aspect, the decision can be based on some other mechanism. NFC controller can, at block 521, store the identity of SE3 316 in secure element message memory 346. In some aspects, NFC controller 340 can be configured to store the identity of the originator of the message after forwarding the response to remote NFC device 380.

Remote NFC device 380 can later send another command 525 to NFC controller 340. In some instances, for example, NFC reader 380 can send a custom (e.g., proprietary) command 525 to NFC controller 340. In some aspects, the command does not include an identifier of the destination secure element 312, 314, and 316 and/or device host 320. This may occur, for example, when the NFC reader 380 assumes that NFC device 310 only has one secure element.

At block 531, NFC controller 340 can refer to protocol table 344a. This can occur, for example, when command 525 excludes an identifier, such as an NFCID2. At block 533, NFC controller 340 can refer to technology table 344b. This can occur, for example, when the protocol of command 525 is not listed in protocol table 344a.

At block 535, NFC controller 340 can refer to secure element message memory 346. This can occur, for example, when both the protocol and technology of command 525 are not listed in protocol table 344a or technology table 344b, respectively. Secure element message memory 346 can include the identity stored by NFC controller 340 at block 521. In the illustrative aspect, for example, NFC controller 340 at block 535 can refer to secure element message memory 346 and retrieve the identity of SE3 316 (as discussed in the illustrative aspect) that was initially stored at block 521. In an aspect, NFC Controller 340 can refer to secure element message memory 346, if necessary, in case the relevant protocol and technology are not listed in the protocol table 344a or technology table 344b.

Once NFC controller 340 retrieves an identity of a secure element from secure element message memory 346, it can forward the command received from NFC reader 380 as command 537 to the identified secure element. In the illustrative aspect, for example, NFC controller 340 can identify the destination as SE3 316 based on the identity stored in secure element message memory 346. NFC controller can then forward command 525 as command 537 to SE3 316.

In some aspects, NFC controller 340 can receive a subsequent response 541 from the identified secure element. In an aspect, the subsequent response also includes an identifier for the originating secure element. NFC controller 340 can forward the subsequent response to NFC reader 380 as response 543. In the illustrative aspect, for example, SE3 316 can generate and send a custom or proprietary (e.g., Check/Update (CUP)) response 541 and send the response to NFC controller 340. NFC controller 340 can forward the custom or proprietary response as response 543 to NFC reader 380. In some aspects, NFC controller 340 can also store the identity of SE3 316 upon forwarding response 543.

Figure 6:
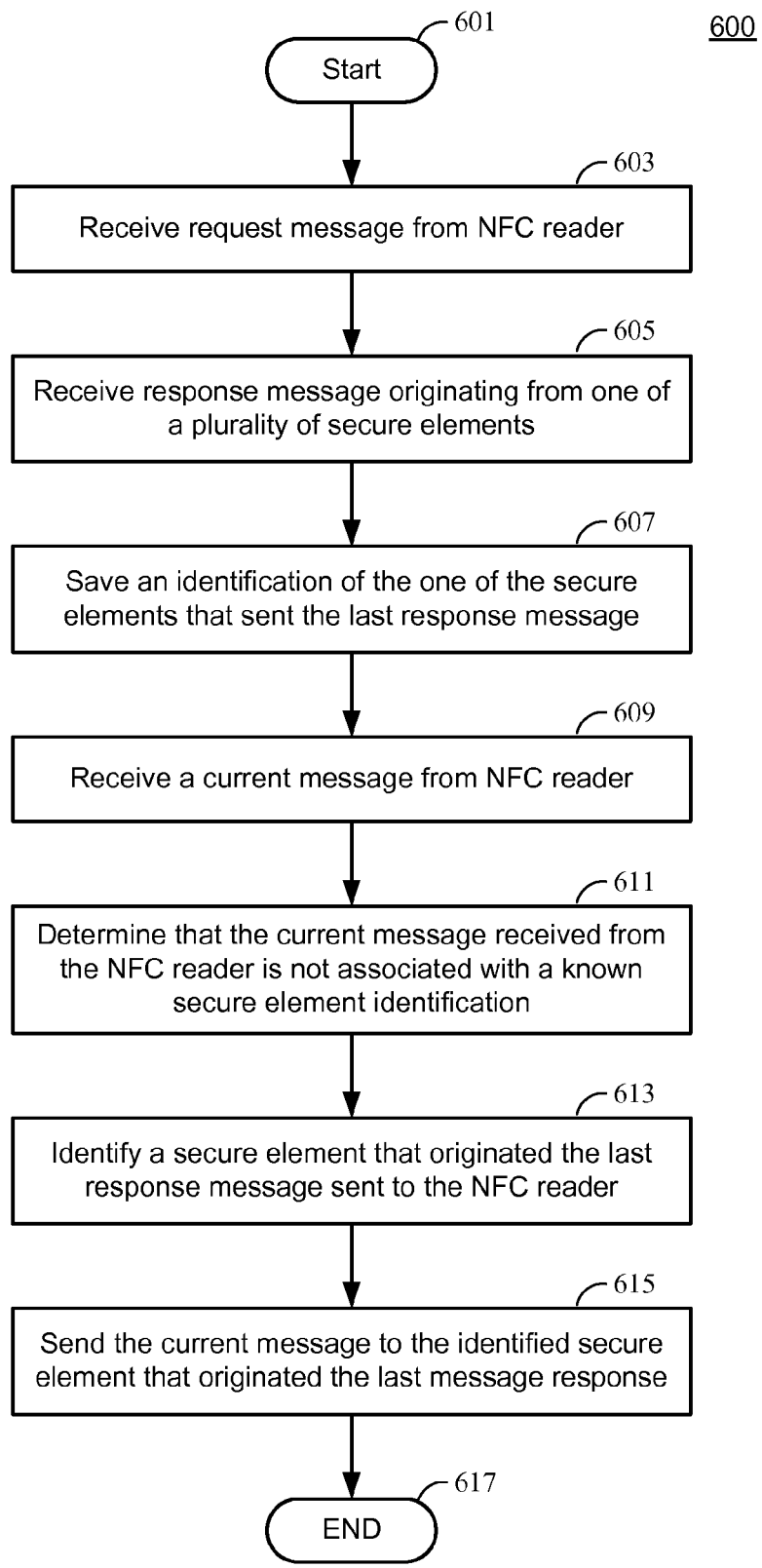
FIG. 6 is a flowchart describing an aspect of the present disclosure.

FIG. 6 is a flowchart describing an aspect of the present disclosure. NFC controller 340 can perform method 600, for example, when receiving messages from a remote NFC device 380 that need to be routed to one of multiple secure elements included in NFC device 310.

At block 601, method 600 starts and at optional block 603, NFC controller 340 can receive a request message from NFC reader 380. For example, NFC controller 340 can receive request message 501 (e.g., a polling command. SENSF_REQ) from NFC reader 380. In some aspects, the request message can be used to identify the specified protocol or technology to be used in subsequent communications with NFC reader 380. NFC controller 340 can then forward the request message to each attached secure element.

At optional block 605, NFC controller 340 can receive a response message from at least one of a plurality of secure elements. For example, NFC controller 340 can receive response messages 511 from secure elements 312, 314, and 316 and/or device host 320 receiving positive response messages from SE1 312 and SE3 316 as SENSF_RES responses 513, 517. In an aspect, each response 513, 517 can include an identifier for the originating secure element (for example, a NFCID2).

At optional block 607, NFC controller 340 can store an identity of a secure element into message memory. For example, NFC controller 340 can chose to forward one of the messages received at block 605 and store the identity of the originating secure element in secure element message memory 346. For example, NFC controller 340 can chose to forward response 517 to remote NFC device 380. In some aspects, NFC controller 340 can choose based on internal criteria, such as the order of reception or some other proprietary method. For example, NFC controller 340 can chose to forward response 517 received from SE3 316 to remote NFC device 380 as response 523. The decision to send response 517 can be based, for example, on receiving response 517 most recently. NFC controller can store the identity of SE3 316 in secure element message memory 346.

At block 609, NFC controller 340 can receive a current message from remote NFC device 380. For example, remote NFC device 380 can send a current command 525 that is received by NFC controller 340. In some instances, for example, NFC controller 340 can receive a custom or proprietary command 525.

At block 611, NFC controller 340 can determine that the current message received from NFC reader 380 is not associated with a known secure element identification. In some aspects, for example, the received command 525 does not include an identifier of the destination secure element, such as one of available secure elements 312, 314, and 316 and/or device host 320. This may occur, for example, when the NFC reader 380 assumes that NFC device 310 only has one secure element. In such instances, routing component 342 in NFC controller 340 can skip referring to SEID table 344c. Routing component 342 can, for example, refer to protocol table 344a. In some aspects, routing component 342 can also refer to technology table 344b. This can occur, for example, when the protocol of command 525 is not listed in protocol table 344a.

At block 613, NFC controller 340 can identify a secure element corresponding to the last response message sent to NFC reader 380. For example, after referring to protocol table 344a and technology table 344b, respectively, routing component 342 can refer to secure element message memory 346. In some aspects, entries for one or more protocols and/or technologies are not included in protocol table 344a and/or technology table 344b. For example, when routing and incoming message in the presence of multiple secure elements that support T3T protocol and also Type F technology messages, entries for T3T protocol in protocol table 344a and Type F technology in technology table 344b can contain no value for a destination. In an aspect, secure element message memory 346 can include the identity stored by NFC controller 340 at optional block 607.

At block 615, NFC controller 340 can send the current message to the identified secure element that sent the last message response (for example, SENSF_RES). For example, once routing component 342 retrieves an identity of a secure element from secure element message memory 346 at block 613, NFC controller 340 can forward the command received from NFC reader 380 as command 537 to the identified secure element. Once the current message is sent at block 617, method 600 ends at block 617.

Figure 7:
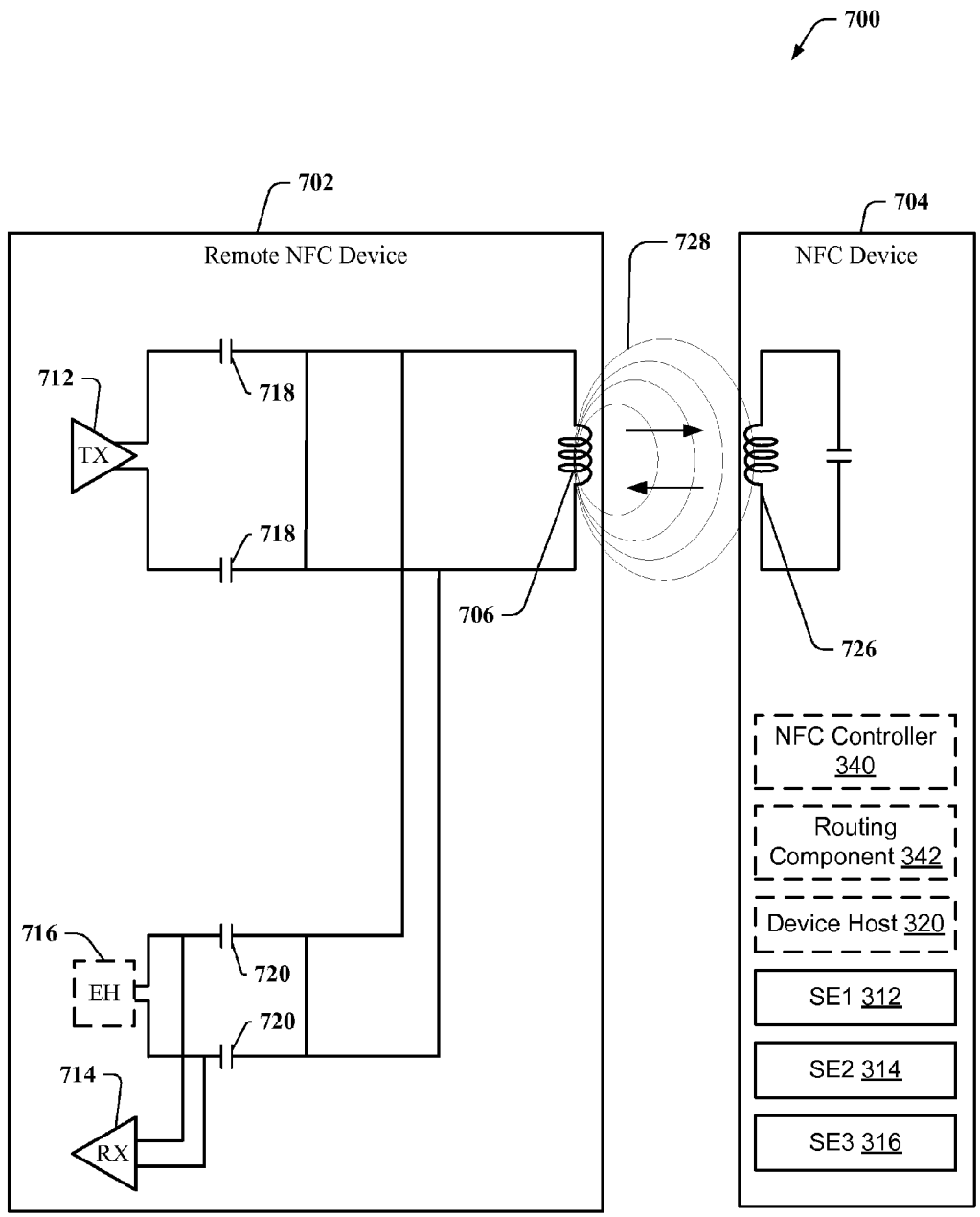
FIG. 7 is a block diagram of another NFC environment in accordance with an aspect of the present disclosure.

With reference to FIG. 7, a block diagram of a communication network 700 according to an aspect is illustrated. Communication network 300 may include remote NFC device 702 and NFC device 704, which may be configured to communicate using NFC. Remote NFC device 702 can include a NFC antenna coil 706 configured to facilitate NFC communications with NFC device 704, which may have a similar NFC coil 726. Remote NFC device 702 may be the same or similar to remote NFC device 380 (FIG. 3), while NFC device 704 may be the same or similar to NFC device 310 (FIG. 3). For example, NFC device 704 may include device host 320 (FIG. 3), NFC controller 340 (FIG. 3), and routing component 342 (FIG. 3), SE1 312 (FIG. 3), SE2 314 (FIG. 3), and SE3 316 (FIG. 3).

As part of NFC communications, NFC antenna coil 706 may generate an electromagnetic field in the area around NFC antenna coil 706. The strength of the field may depend on the power source and the size and number of turns in NFC antenna coil 706. Further, impedance mismatches may cause a range of amplitude/phase changes dependent on size and inductance of NFC antenna coil 706 in magnetic field 728. Capacitor 718 may be connected in parallel with the NFC antenna coil 706, where a transmitter component 712 and capacitors 718 may form an RLC oscillator, establishing a resonant circuit with a frequency that corresponds to one or more transmission frequencies of remote NFC device 702.

Because of the wavelength of the frequency used is several times greater than the close-proximity distance between NFC antenna coil 706 and NFC antenna coil 726 of NFC device 704, the electromagnetic field can be treated as an alternating magnetic field 728. This region of close proximity is referred to as the near-field region. Remote NFC device 702 and NFC device 704 may be linked by their mutual inductance, as in an air-core transformer, with the primary coil being the NFC antenna coil 706 and the secondary coil being antenna coil 726 of NFC device 704. Alternating magnetic field 728 penetrates antenna coil 726 of NFC device 704 when it is in the near-field region, inducing an alternating current in antenna coil 726 of NFC device 704.

When operating in a listening mode, NFC antenna coil 706, capacitors 720, optional energy harvester (EH) 716, and receiver component 714 may form an RLC oscillator, establishing a resonant circuit, over which modulation of signals by NFC device 704 can be detected. When operating in a transmitting mode, remote NFC device 702 may apply a variable load resistance to NFC antenna coil 706, thereby modulating magnetic field 728, to send a transmitted signal to transfer data to NFC device 704.

As part of NFC communications, NFC antenna coil 706 may generate an electromagnetic field in the area around NFC antenna coil 706. The strength of the field may depend on the power source and the size and number of turns in NFC antenna coil 706. Further, impedance mismatches may cause a range of amplitude/phase changes dependent on the size and inductance of NFC antenna coil 706 in magnetic field 728. Capacitor 718 may be connected in parallel with NFC antenna coil 706, where transmitter component 712 and capacitors 718 may form and RLC oscillator, establishing an resonant circuit with a frequency that corresponds to one or more transmission frequencies of remote NFC device 702.

Figure 8:
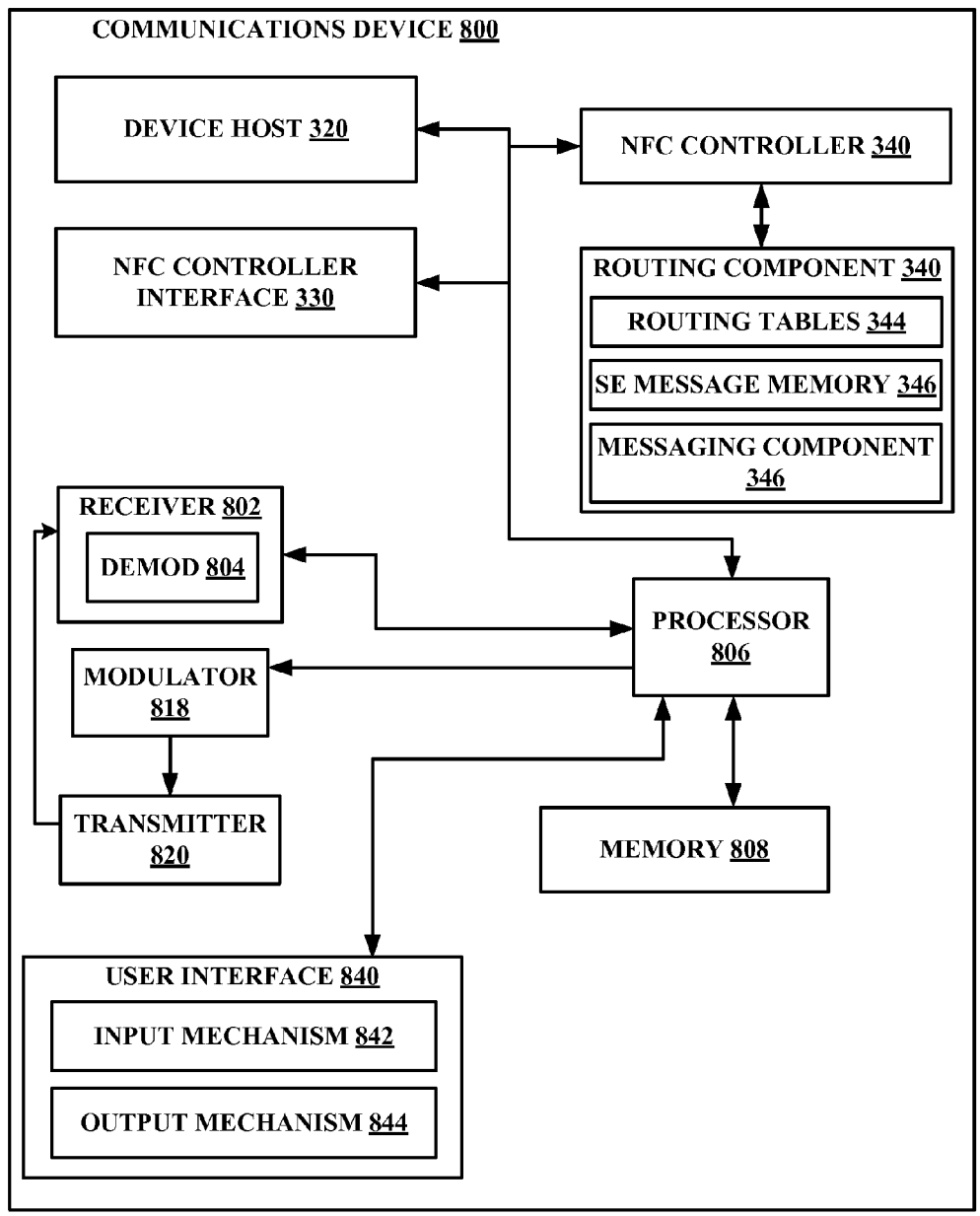
FIG. 8 is a functional block diagram example architecture of a communications device in accordance with an aspect of the present disclosure.

FIG. 8 illustrates an example architecture of communications device 800. Communications device 800 can be the same as or include, for example, one of NFC device 310, 704, remote NFC device 380, 702, etc., and may thus include components thereof and/or perform the associated functions described above.

As depicted in FIG. 8, communications device 800 includes receiver 802 that receives a signal from, for instance, a receive antenna, performs typical actions on (e.g., filters, amplifies, down-converts, etc.) the received signal, and digitizes the conditioned signal to obtain samples. Receiver 802 can include a demodulator 804 that can demodulate received symbols and provide them to processor 806 for channel estimation.

Processor 806 can be a processor dedicated to analyzing information received by receiver 802 and/or generating information for transmission by transmitter 820. In an aspect, processor 806 can be a processor that controls one or more components of communications device 800. In another aspect, processor 806 can be a processor that both analyzes information received by receiver 802, generates information for transmitter 820, and controls one or more components of communications device 800. Further, signals may be prepared for transmission by transmitter 820 through modulator 818, which can modulate the signals processed by processor 806.

Communications device 800 can additionally include memory 808 that is operatively coupled to processor 806. Memory 808 can store, for example: data to be transmitted, received data, information related to available channels, Transmission Control Protocol (TCP) flows, data associated with analyzed signals and/or interference strength, information related to an assigned channel, power, rate, or the like, and any other suitable information for estimating a channel and communicating via the channel. In some aspects, memory 808 can store one or more elements of routing component 342, including, for example, routing tables 344, secure element message memory 346, and/or messaging component 348.

It will be appreciated that a data store (e.g., memory 808) described herein can be either volatile memory or nonvolatile memory, or can include both volatile and nonvolatile memory. By way of illustration, and not limitation, nonvolatile memory can include: read-only memory (ROM), programmable ROM (PROM), electrically-programmable ROM (EPROM), electrically-erasable PROM (EEPROM), or flash memory. Volatile memory can include random-access memory (RAM), which acts as external cache memory. By way of illustration and not limitation, RAM is available in many forms, such as: synchronous RAM (SRAM), dynamic RAM (DRAM), synchronous DRAM (SDRAM), double data-rate SDRAM (DDR SDRAM), enhanched SDRAM (ESDRAM), Synchlink DRAM (SLDRAM), and direct Rambus RAM (DRRAM). Memory 808 of the subject systems and methods can comprise, without being limited to, these and any other suitable types of memory. For example, memory 808 can include instructions for performing the functions of the various components described herein.

Communications device 800 can include NFC controller interface (NCI) 330. In an aspect, NCI 330 can be configured to enable communications between NFC controller 340 and device host 320. Additionally, communications device 800 can include user interface (UI) 840. UI 840 can include input mechanisms 842 for generating inputs into communications device 800, and output mechanism 844 for generating information for consumption by the user of the communications device 800. For example, input mechanism 842 can include a mechanism, such as: a key or keyboard, a mouse, a touch-screen display, an audio speaker, a haptic feedback mechanism, etc. In the illustrated aspects, the output mechanism 844 can include a display configured to present media content that is in image or video format or an audio speaker to present media that is in an audio format.

As used in this application, the terms "component", "module", "system", and the like, are intended to include a computer-related entity, such as, but not limited to: hardware, firmware, a combination of hardware and software, software, or software in execution. For example, a component may be, but is not limited to being: a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer-readable media having various data structures stored thereon. The components may communicate by way of local and/or remote processes, such as in accordance with a signal having one or more data packets, such as data from one component interacting with another component in a local system, distributed system, and/or across a network, such as the Internet with other systems by way of the signal.

Furthermore, various aspects are described herein in connection with a terminal, which can be a wired terminal or a wireless terminal. A terminal can also be called: a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be: a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as: an access point, a Node B, or some other terminology.

Moreover, the term "or" is intended to mean an inclusive "or", rather than an exclusive "or" (XOR). That is, unless specified otherwise, or clear from context, the phrase, "X employs A or B" is intended to mean any of the natural inclusive permutations. That is, the phrase, "X employs A and B" is satisfied by any of the following instances: X employs, A; X employs B; or X employs both A and B. In addition, the articles "a" and "an", as used in this application and the appended claims, should generally be construed to mean "one or more", unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology, such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology, such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with: a general purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

The invention claimed is:

1. A method of wireless near-field communications (NFC), comprising:
   receiving, by an NFC controller, a request message corresponding to a poll command from an NFC reader prior to receiving a current message;
   receiving, by the NFC controller, a last response message from one of a plurality of secure elements;
   saving, by the NFC controller, an identification of the one of the plurality of secure elements that sent the last response message;
   receiving, by the NFC controller, the current message from a NFC reader;
   determining that the current message does not include an identification of a secure element;
   identifying, by the NFC controller, a secure element corresponding to the last response message sent to the NFC reader based at least on a table of known technology-based routing entries indicating at least one technology type; and
   sending, by the NFC controller, the current message to the identified secure element that originated the last response message sent to the NFC reader.

2. The method of claim 1, further comprising:
   referring, by the NFC controller, to a table of known protocol-based routing entries in response to receiving the current message; and
   determining, by the NFC controller, that an entry for a protocol type corresponding to the protocol type of the current message is not included in the table of known protocol-based routing entries,
   wherein the identifying of the secure element corresponding to the last response message is in response to at least the determining that the protocol type of the current message is not included in the table of known protocol-based routing entries.

3. The method of claim 1, further comprising:
   referring, by the NFC controller, to the table of known technology-based routing entries in response to receiving the current message; and
   determining, by the NFC controller, that an entry for a technology type corresponding to the technology type of the current message is not included in the table of known technology-based routing entries, wherein the identifying of the secure element corresponding to the last response message is in response to at least the determining that the technology type of the current message is not included in the table of known technology-based routing entries.

4. The method of claim 1, further comprising:
   receiving, by the NFC controller, a SENSF_RESP poll response from the identified secure element that sent the last response message, wherein receiving the current message comprises receiving a current proprietary command.

5. The method of claim 1, further comprising:
   receiving, by the NFC controller, a SENSF_RESP poll response from the one of the secure elements, wherein the poll command corresponds to a SENSF_REQ poll command.

6. The method of claim 1, wherein the identified secure element comprises a virtual secure element in a device host.

7. An apparatus for near-field communications (NFC), comprising:
   means for receiving, by an NFC controller, a request message corresponding to a poll command from an NFC reader prior to receiving a current message;
   means for receiving, by the NFC controller, a last response message from one of a plurality of secure elements;
   means for saving, by the NFC controller, an identification of the one of the plurality of secure elements that sent the last response message;
   means for receiving, by the NFC controller, a current message from the NFC reader;
   means for determining that the current message does not include an identification of a secure element;
   means for identifying, by the NFC controller, a secure element corresponding to the last response message sent to the NFC reader based at least on a table of known technology-based routing entries indicating at least one technology type; and
   means for sending, by the NFC controller, the current message to the identified secure element that originated the last response message sent to the NFC reader.

8. The apparatus of claim 7, further comprising:
   means for referring, by the NFC controller, to a table of known protocol-based routing entries in response to receiving the current message; and means for determining, by the NFC controller, that an entry for a protocol type corresponding to the protocol type of the current message is not included in the table of known protocol-based routing entries,
wherein the identifying of the secure element corresponding to the last response message is in response to at least the determining that the protocol type of the current message is not included in the table of known protocol-based routing entries.

9. The apparatus of claim 7, further comprising:
means for referring, by the NFC controller, to the table of known technology-based routing entries in response to receiving the current message; and
means for determining, by the NFC controller, that an entry for a technology type corresponding to the technology type of the current message is not included in the table of known technology-based routing entries,
wherein the identifying of the secure element corresponding to the last response message is in response to at least the determining that the technology type of the current message is not included in the table of known technology-based routing entries.

10. The apparatus of claim 7, further comprising:
means for receiving, by the NFC controller, a SENSF_RESP poll response from the identified secure element that sent the last response message, wherein receiving the current message comprises receiving a current proprietary command.

11. The apparatus of claim 7, further comprising:
means for receiving, by the NFC controller, a SENSF_RESP poll response from the one of the secure elements, wherein the poll command corresponds to a SENSF_REQ poll command.

12. The apparatus of claim 7, wherein the identified secure element comprises a virtual secure element in a device host.

13. An apparatus for near-field communications (NFC), comprising:
a NFC controller configured to:
receive a request message corresponding to a poll command from an NFC reader prior to receiving a current message;
receive a last response message from one of a plurality of secure elements;
save an identification of the one of the plurality of secure elements that sent the last response message;
receive the current message from the NFC reader;
determine that the current message does not include an identification of a secure element;
identify a secure element corresponding to the last response message sent to the NFC reader based at least on a table of known technology-based routing entries indicating at least one technology type; and
send the current message to the identified secure element that originated the last response message sent to the NFC reader.

14. The apparatus of claim 13, wherein the NFC controller is further configured to:
refer to a table of known protocol-based routing entries in response to receiving the current message; and
determine that an entry for a protocol type corresponding to the protocol type of the current message is not included in the table of known protocol-based routing entries,
wherein the identifying of the secure element corresponding to the last response message is in response to at least the determining that the protocol type of the current message is not included in the table of known protocol-based routing entries.

15. The apparatus of claim 13, wherein the NFC controller is further configured to:
refer to the table of known technology-based routing entries in response to receiving the current message; and
determine that an entry for a technology type corresponding to the technology type of the current message is not included in the table of known technology-based routing entries,
wherein the identifying of the secure element corresponding to the last response message is in response to at least the determining that the technology type of the current message is not included in the table of known technology-based routing entries.

16. The apparatus of claim 13, wherein the NFC controller is further configured to:
receive a SENSF_RESP poll response from the identified secure element that sent the last response message, wherein receiving the current message comprises receiving a current proprietary command.

17. The apparatus of claim 13, wherein the NFC controller is further configured to:
receiving, by the NFC controller, a SENSF_RESP poll response from the one of the secure elements, wherein the poll command to a SENSF_REQ poll command.

18. A non-transitory computer-readable medium storing computer-executable code for near-field communications (NFC), comprising:
code for receiving a request message corresponding to a poll command from an NFC reader prior to
receiving a current message;
code for receiving a last response message from one of a plurality of secure elements; code for
saving an identification of the one of the plurality of secure elements that sent the last response message;
code for receiving the current message from the NFC reader;
code for determining that the current message does not include an identification of a secure element;
code for identifying a secure element corresponding to the last response message sent to the NFC reader based at least on a table of known technology-based routing entries indicating at least one technology type; and
code for sending the current message to the identified secure element that originated the last response message sent to the NFC reader.

19. The computer-readable medium of claim 18, wherein the code for NFC further comprises:
code for referring to a table of known protocol-based routing entries in response to receiving the current message; and
code for determining that an entry for a protocol type corresponding to the protocol type of the current message is not included in the table of known protocol-based routing entries,
wherein the identifying of the secure element corresponding to the last response message is in response to at least the determining that the protocol type of the current message is not included in the table of known protocol-based routing entries.

20. The computer-readable medium of claim 18, wherein the code for NFC further comprises:
code for referring to the table of known technology-based routing entries in response to receiving the current message; and code for determining that an entry for a technology type corresponding to the technology type of the current message is not included in the table of known technology-based routing entries, wherein the identifying of the secure element corresponding to the last response message is in response to at least the determining that the technology type of the current message is not included in the table of known technology-based routing entries.

21. The computer-readable medium of claim 18, wherein the code for NFC further comprises:

code for receiving a SENSF_RESP poll response from the identified secure element that sent the last response message, wherein receiving the current message comprises receiving a current proprietary command.

22. The computer-readable medium of claim 18, wherein the code for NFC further comprises:

code for receiving, by the NFC controller, a SENSF_RESP poll response from the one of the secure elements, wherein the poll command corresponds to a SENSF_REQ poll command.

* * * * *